(12) United States Patent
Miyazawa

(10) Patent No.: US 7,166,872 B2
(45) Date of Patent: Jan. 23, 2007

(54) DEVICE SUBSTRATE, PRODUCTION METHOD THEREFOR, ELECTRONIC DEVICE, PRODUCTION METHOD THEREFOR, OPTIC DEVICE, PRODUCTION METHOD THEREFOR, AND ELECTRONIC APPARATUS

(75) Inventor: Takashi Miyazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 361 days.

(21) Appl. No.: 10/639,534

(22) Filed: Aug. 13, 2003

(65) Prior Publication Data

US 2004/0080920 A1    Apr. 29, 2004

(30) Foreign Application Priority Data

Aug. 22, 2002    (JP)    ............................. 2002-242476

(51) Int. Cl.
  *H01L 27/15*    (2006.01)
  *H01L 21/00*    (2006.01)
  *C09K 19/52*    (2006.01)
(52) U.S. Cl. ............................. 257/98; 428/1.1; 438/29
(58) Field of Classification Search ................ 257/91, 257/98; 438/27, 29; 428/1.1, 1.3
See application file for complete search history.

(56) References Cited

U.S. PATENT DOCUMENTS

| 5,512,336 | A | * | 4/1996 | Yamahara | .................... | 428/1.2 |
| 5,547,763 | A | * | 8/1996 | Scozzafava et al. | ........ | 428/447 |
| 5,976,686 | A | * | 11/1999 | Kaytor et al. | ............ | 428/317.9 |
| 6,795,463 | B1 | | 9/2004 | Koyama et al. | | |

FOREIGN PATENT DOCUMENTS

| JP | A-5-323327 | 12/1993 |
| JP | A-7-152024 | 6/1995 |
| JP | A-7-159762 | 6/1995 |
| JP | A-8-58375 | 3/1996 |
| JP | A-8-179287 | 7/1996 |
| JP | A-8-278504 | 10/1996 |
| JP | A-8-292423 | 11/1996 |
| JP | A-9-138395 | 5/1997 |
| JP | A-9-302101 | 11/1997 |
| JP | A-10-10502 | 1/1998 |
| JP | A-10-115704 | 5/1998 |
| JP | A-10-319375 | 12/1998 |
| JP | A-10-333131 | 12/1998 |
| JP | A-11-24102 | 1/1999 |
| JP | A-11-80379 | 3/1999 |
| JP | A-11-305204 | 11/1999 |
| JP | A-2000-261036 | 9/2000 |
| JP | A-2000-267074 | 9/2000 |

(Continued)

*Primary Examiner*—Evan Pert
(74) *Attorney, Agent, or Firm*—Oliff & Berridge, PLC

(57) ABSTRACT

To provide a device substrate and a production method therefor, which device substrate has a film having a reflection function and can be formed by a production process that does not require a vacuum process inviting increased production cost.

A device substrate includes a substrate, an electronic element mounted above the substrate, and a film having a phase separation structure and arranged above the electronic element so as to cover at least a part of the substrate or the electronic element. Alternatively, the film having a phase separation structure in the above configuration may be arranged below the electronic element. The film having a phase separation structure can be arranged so as not come in contact with the substrate.

24 Claims, 7 Drawing Sheets

FOREIGN PATENT DOCUMENTS

| | | |
|---|---|---|
| JP | A-2000-267143 | 9/2000 |
| JP | A-2000-303002 | 10/2000 |
| JP | A-2001-52861 | 2/2001 |
| JP | A-2001-189466 | 7/2001 |
| JP | A-2001-244066 | 9/2001 |
| JP | A-2001-305316 | 10/2001 |
| JP | A-2001-318201 | 11/2001 |
| JP | A-2002-110362 | 4/2002 |
| JP | A-2002-134277 | 5/2002 |
| JP | A-2002-157241 | 5/2002 |
| JP | A 2002-229070 | 8/2002 |
| JP | A-2003-165241 | 6/2003 |
| JP | A-2005-500229 | 1/2005 |
| JP | A-2005-500558 | 1/2005 |
| WO | WO 02/081372 A2 | 10/2002 |
| WO | WO 02/095805 A2 | 11/2002 |

* cited by examiner

DEVICE SUBSTRATE, PRODUCTION METHOD THEREFOR, ELECTRONIC DEVICE, PRODUCTION METHOD THEREFOR, OPTIC DEVICE, PRODUCTION METHOD THEREFOR, AND ELECTRONIC APPARATUS

BACKGROUND OF THE INVENTION

1. Field of the Invention

The present invention relates to a device substrate and a production method therefor, and electronic element and a production method therefor, an optical device and a production method therefor, and electronic apparatus. The device substrate includes, in an optical device having a multilayer structure laminated on a substrate, a film having a phase separation structure arranged previously on the substrate. The film serves as a layer to reflect light traveling in a thickness direction of the device so as to travel only in desired one direction. The device substrate according to the present invention can be appropriately used as a substrate to carry an optical device such as an electroluminescence device (EL device).

2. Description of Related Art

The related art includes devices having an optical reflection mechanism including, for example, semiconductor devices for laser, reflective liquid crystal devices, and EL devices. Such devices use a structure including a single-layer film or multilayer film so as to reflect light traveling in the devices efficiently. In addition, the following publications show that such devices can have further improved optical capabilities by arranging a film, having a high reflectance, in an appropriate position in the devices.

(1) As the semiconductor devices for laser, an example which constitutes a surface emitting semiconductor laser can be found in Japanese Patent Application No. 2002-157241. A layer necessary for at least exhibiting desired functions as a semiconductor device is referred to as a "function layer" and refers to, for example, at least an upper mirror, a lower mirrors, and a semiconductor layer structure sandwiched between these mirror layers when the device exhibits functions as the aforementioned surface emitting laser. The upper and lower mirrors herein serve as a reflector against laser light generated in the semiconductor layer structure and constitute a resonator.

The upper and lower mirrors having such a reflection function are distributed Bragg reflector (DBR) mirrors formed by laminating about 20 to 30 pairs of, for example, two $Al_xGa_{1-a}$. As layers having different compositions in alternate order are formed by a vacuum process, for example, using a molecular beam epitaxy method (MBE method).

(2) As the reflective liquid crystal devices, an example applied to a reflective color filter can be found in Japanese Unexamined Patent Application Publication No. 10-115704. The reflective film described in the publication has a configuration of a multilayer interference film including a multilayer assemblage of a thin film comprising a high refractive index material and a thin film including a low refractive index material alternately laminated on a substrate. Specifically, the reflective film described in the embodiment thereof is a multilayer interference film prepared by laminating silicon dioxide ($SiO_2$: refractive index 1.461) and titanium dioxide ($TiO_2$: refractive index 2.495) alternately by using, for example, as electron beam (EB) deposition method.

(3) As the reflective film for use in EL devices, detailed description thereof can be found in, for example, Japanese Unexamined Patent Application Publication No. 2001-52861. Such EL devices have a fundamental configuration including a substrate, and a first electrode, a layer contributing to light emission (light-emitting layer), and a second electrode, arranged on the substrate in this order. Light generated from the light-emitting layer is emitted via the first electrode and the substrate (back emission: hereinafter briefly referred to as BE) or emitted via the second electrode (top emission: hereinafter briefly referred to as TE).

In the BE system, transparent materials are used for the substrate and the first electrode, and it is preferred that the second electrode is a reflective electrode or has a reflective film thereon to thereby increase the emission efficiency. In contrast, in the TE system, a transparent material is used for the second electrode, and it is preferred that the first electrode is a reflective electrode or a reflective film is arranged between the first electrode and the substrate to thereby increase the emission efficiency. The following materials for these transparent electrode, reflective electrode, and reflective film are listed.

Transparent electrode: CuI, ITO, SnO2, ZnO and other transparent materials

Reflective electrode: aluminum, calcium, and other metals; magnesium-silver, lithium-aluminum, and other alloys; magnesium/silver, and other multilayer films of metals, (lithium fluoride)/aluminum, and other multilayer films of an insulator and a metal Reflection coating: known metal films Example (1) above, discloses an example in which the device configuration in BE and an Al electrode as the second electrode continuing a reflective electrode is formed by vapor deposition.

As described in (1) to (3) above, the reflective layers used in related art devices having an optical reflection mechanism must be prepared by a preparation method using a vacuum process. Device for use in this preparation method is expensive, operates at high cost and requires a large space for the arrangement thereof. Accordingly, the production cost of the reflective films is reduced to an only limited extent.

In addition, many of reflective layers including a single-layer film may not sufficiently satisfy the optimum reflection conditions for the devices. Consequently, a structure including a multilayer film is widely used. However, this complicates the production process of the reflective layer, thus inviting high cost of the devices.

SUMMARY OF THE INVENTION

To address the above problems, the present invention provides a device substrate and a production method therefor, which device substrate has a film having a reflection function and can be formed by a production process that does not require a vacuum process inviting increased production cost.

To address the above problems, the present invention provides a first device substrate including a substrate, an electronic element mounted above the substrate; and a film having a phase separation structure and being arranged above the electronic element so as to cover at least a part of the substrate or the electronic element.

In addition, the present invention provides a second device substrate including a substrate; an electrode element mounted above the substrate; and a film having a phase separation structure and being arranged below the electronic element.

The two device substrates having the above configurations, i.e., the first and second device substrates can have a function which is necessary when a light-emitting device is mounted thereon. For example, the device substrates structurally have, previously formed on a substrate, an electronic element to drive a light-emitting device, or a film having a phase separation structure and capable of reflecting light emitted from the light-emitting device.

By selecting the first or second device substrate, the order of components arranged under a light-emitting device can be changed. Specifically, when the light-emitting device is arranged on the first device substrate, the film having a phase separation structure is arranged nearer to the light-emitting device than an electronic element. In contrast, when the light-emitting device is arranged on the second device substrate, the electronic element is arranged nearer to the light-emitting device than the phase separation structure. As is described later, the film having a phase separation structure according to the present invention can have an insulating function in addition to a reflection function by appropriately selecting the combination of material phases constituting the film and can also play a role as an insulating film by arranging at a preferred position between the electronic element and the light-emitting device. As a result, the resulting device substrate has a decreased number of required layers as compared with related art equivalents and can be produced at lower cost.

The film having a phase separation structure includes, for example, plural phases of materials that are immiscible with each other. For example, when the film is material phases including two materials (herein temporarily referred to as a first material and a second material), the film can have a reflection function by appropriately selecting materials to constitute the first material and the second material, respectively, even if the film apparently has a single layer structure. Accordingly, a device substrate having a reflective layer can be provided by including the film having a phase separation structure. The properties of the reflection function, such as wavelength region having the maximum reflectance and half width, can be controlled by appropriately selecting the materials that are immiscible with each other. In addition, the film can also have an electric insulating function, in addition to the reflection function, by appropriately selecting the materials that are immiscible with each other.

In such a device substrate, structurally including a film having a phase separation structure that also has an electrically insulating function in addition to the reflection function, the film having a phase separation structure is arranged between a substrate and a device, serves as an insulating film insulating the substrate from the device and acts as a reflective film with respect to the device.

Related art device substrates require an electrode formed from a material having a reflection function in addition to an electrically conducting function between the device and an insulating member. However, according to the aforementioned configuration, a transparent electrode can be used as both electrodes dispose above and below the device, and the device is structurally sandwiched between the same material. Thus, the device receives balanced stress from the both electrodes, thus avoiding internal strain.

The electronic element constituting the device substrate is a transistor, diode, or another device having a switching function and exhibits, for example, a function to drive or controlling a light-emitting device mounted on the device substrate. Examples of the electronic element are driving devices and control devices for use in semiconductor devices for laser, light-emitting diodes, reflective liquid crystal devices, and EL devices.

The film having a phase separation structure does not require an expensive vacuum process for its production, can be easily formed, for example, by a coating process under normal atmospheric pressure and can thereby provide a device substrate at very low cost.

To form one side of such a related art device susbtrate, a film prepared by a vacuum process must be used, thus inviting increased cost. In addition, the film must have a multilayer structure including laminated plural films so as to be a layer having an optimum reflection function, thus inviting further increased cost. The device substrate according to the present invention can solve these problems.

The film having a phase separation structure and constituting the device substrate according to the present invention, may be divided and arranged into portions corresponding to the electronic element.

According to this configuration, for example, when plural electronic elements are present on the substrate and drive different light-emitting devices emitting light of different wavelengths, respectively, the film having a phase separation structure is divided and arranged into portions corresponding to the individual electronic elements. Each of the resulting divided films having a phase separation structure can have reflection properties suitable for the wavelengths of light emitted from the individual light-emitting devices. More specifically, for example, one film having a phase separation structure can selectively reflect light within a specific wavelength range by setting the size of domains constituting the phase separation structure so as to fit the wavelength of light to be reflected.

In other words, according to the above configuration, the individual films having a phase separation structure can be films having reflection capabilities corresponding to light-emitting properties of the individual light-emitting devices, respectively. For example, when light-emitting devices which emit light of different colors, such as red, green and blue, are two-dimensionally arranged on one side of a substrate, films having different reflection capabilities corresponding to the wavelengths of light emitted from the individual light-emitting devices are arranged as the film having a phase separation structure, only in portions corresponding to the regions where the individual electronic elements are arranged with respect to the individual light-emitting devices. Thus, the resulting device substrate can most efficiently reflect light.

The film having a phase separation structure may be divided and arranged into portions corresponding to individual electronic elements on one side of a substrate on which the devices are mounted. According to this configuration, even when individual electronic elements are mounted on the substrate at some intervals, the films having a phase separation structure can be arranged at desired positions so as to cover appropriate areas.

The film having a phase separation structure and constituting the device substrate according to the present invention, may be arranged so as not to come in contact with the substrate.

According to this configuration, the film having a phase separation structure can be formed after the preparation of another film and/or structure to be arranged at least on one side of the substrate, and the resulting film having a phase separation structure, can serve as a film to reflect light emitted from a light-emitting device arranged so as to cover the other film and/or structure. Such a film, having a phase separation structure and capable of being formed after the preparation of the other film and/or structure can be always formed as a film reliably having a reflection capability corresponding to the properties of light passing through the other film and/or structure, as the film having a phase separation structure. Thus, the resulting device substrate can have a satisfactorily stable reflection function.

In the configuration in which the film having a phase separation structure is arranged so as not to come in contact with the substrate, light emitted from the light-emitting device is reflected toward the substrate or is reflected toward an opposite direction to the substrate. When the light emitted from the light-emitting device is reflected toward the substrate, the film having a phase separation structure is arranged above the light-emitting device disposed on the surface of the substrate. In contrast, when light emitted from the light-emitting device is reflected toward an opposite direction to the substrate, the film having a phase separation structure is arranged below the light-emitting device disposed on the surface of the substrate. In this case, the film having a phase separation structure can be arranged between the surface of the substrate and the light-emitting device or can be arranged on the backside of the substrate.

When the film having a phase separation structure is arranged on the outside of the device and the substrate in the configuration in which the film is arranged so as not to come in contact with the substrate, the film may play a role as an insulating member with respect to the outside of the film in addition to a role as a reflective film with respect to devices inside the film. In this case, the device substrate can have increased resistance against external electrostatic discharge damage. For example, the film can also serve as a member to seal the device from the outside by machining and flattening the outer surface of the film.

For example, an electronic device including the device substrate including the electronic element and the film having a phase separation structure, and at least an organic EL device as an optical device arranged on the device substrate can be free of electrical, optical, or mechanical malfunctions or defects of the device and can have a higher long-term reliability than conventional equivalents, since the electronic device has minimized internal strain or improved resistance against external electrostatic discharge damage.

In addition, the present invention provides a third device substrate including a substrate; an electronic element layer including plural switching devices and being arranged on the substrate; and an insulating film having a phase separation structure and being arranged above the electronic element layer so as to cover at least a part of the electronic element layer.

According to the third device substrate, when an optical device, for example, is formed afterward on the substrate, that is, on an insulating film having a phase separation structure, the insulating film having a phase separation structure can electrically insulate the electronic element layer including plural switching devices from the optical device. In this case, by arranging the insulating film having a phase separation structure so as to cover at least a part of the electronic element layer, the film can also serve to establish electrical continuity, for example, between a specific switching device constituting the electronic element layer and a specific portion of the optical device.

Such an insulating film having a phase separation structure can be obtained by composing the phase separation structure by plural phases of materials that are immiscible with each other and appropriately selecting material phases having electrical insulating properties or a combination of such material phases. A material phase additionally having a reflection function can be selected herein, as described above.

The insulating film having a phase separation structure can have a reflection function in addition to the electrical insulating function by appropriately selecting the materials immiscible with each other. In this case, the first film can satisfy the both functions even if it apparently has a single layer structure. Accordingly, this configuration also contributes to provide a device substrate that can avoid problems due to interfaces, that is, can avoid electrical, optical, or mechanical malfunctions. These malfunctions occurred in related art structures including a laminate of an insulating film and a reflective film.

The film having a phase separation structure, according to the present invention, includes materials that are immiscible with each other.

According to this configuration, the film having a phase separation structure can be easily formed by applying a liquid material onto a substrate, which liquid material contains at least two materials (herein referred to as a first material) and a second material) that are immiscible with each other. For example, to cover the entire one side of the substrate with the film, any general coating process such as spin coating or dip coating can be employed.

However, to arrange the film in a desired region alone, i.e., a portion corresponding to the region on which the device is mounted, an ink jet process that is highly capable of forming a uniform coated film onto a minute region is preferred. This process is particularly preferred when the region on which the film is arranged is small and is located or dispersed.

In the above configuration, the liquid material containing the first material and the second material means a liquid material L2. The liquid material L2 is prepared in the following manner. Initially, a block copolymer constituting the first material is mixed with, as the second material, a homopolymer that is miscible with one of individual block chains (also referred to as polymer chains) constituting the block copolymer to thereby yield a liquid material L1. The liquid material L1 is then melted by heating to a temperature equal to or higher than the "order-disorder transition temperature ($T_{ODT}$)" of the system of the block copolymer or is dissolved in a solvent common to the first material and the second material to thereby yield the liquid material L2 which is completely blended and constitutes a disordered mixture.

A first exemplary method to produce a device substrate, according to the present invention, includes a element production step to form an electronic element on a substrate; and a film-forming step to apply a mixture, so as to cover at least a part of the electronic element to thereby form a film having a phase separation structure, the mixture including plural materials being immiscible with each other.

The method has only to include an element production step in which an electronic element is previously formed on a substrate; and a film-forming step in which a film having a phase separation structure is formed by a coating process so as to cover at least a part of the electronic element. By this configuration, a reflective film having a desired reflection function can be appropriately formed at a predetermined position so as to cover an optimum region even at any position of the substrate. The coating process includes, for example, a dipping process and a spin coating process.

This method to produce a device substrate can form a desired film by a coating process, can thereby form the film under atmospheric conditions, does not require expensive facilities necessary for a vacuum process and thereby significantly reduces the production cost of such films, in contrast to related art production methods which require the vacuum process.

A second exemplary method to produce a device substrate, according to the present invention, includes: an element production step of forming an electronic element on a substrate; and a film-forming step applying a mixture by a liquid discharge process, so as to cover at least a part of the electronic element to thereby form a film having a phase separation structure, the mixture including plural materials being immiscible with each other.

According to the second exemplary method to produce a device substrate, plural materials can be applied separately to different positions by the liquid discharge process.

As is described above, the first material and the second material immiscible with each other may be used as the two or more materials and may be discharged through fine nozzle orifices by an ink jet process, a liquid discharge process. In this case, the first material and the second material can be applied to different portions to form a film by discharging them through the nozzle orifices so as to arrange a fine area including one of the two materials adjacent to another fine area including the other material, or by controlling the position of an ink jet head having the nozzle orifices. In particular, the discharge amounts of the first material and the second material can be controlled highly precisely to thereby yield a film having a uniform thickness by using a coating process of intermittently applying these materials to different portions to form a film.

The ink jet process does not require an expensive vacuum process and can utilize materials more efficiently than the other coating processes, such as spin coating and dip coating. Accordingly, the method can produce the device substrate at further reduced production cost.

Plural materials, such as the first material and the second material, can be applied separately to different portions by using plural mixtures including different types or different amounts of the plural materials as the mixture in the first or second method to produce a device substrate.

In particular, plural mixtures including different types or different amounts of the plural materials may be used as the mixture in the second method to produce a device substrate and the plural mixtures may be arranged to predetermined different positions by a liquid discharge process. Thus, the plural materials can be applied separately locally and thereby films having a phase separation structure corresponding to the pattern or array of fine electronic elements can be formed.

The first or second exemplary method to produce a device substrate according to the present invention may further include a drying step to remove a solvent after the film-forming step.

In the drying step for removing the solvent, the solvent is removed from the film formed in the application step by evaporation to thereby allow the film to have a regular ordered structure. For example, the resulting film may have a micro phase separation structure including individual polymer phases (also refereed to as block chain phases) having a lattice space of 100 mm or more. The drying step can be performed under reduced pressure so as to remove the solvent from the film more efficiently.

The first or second exemplary method to produce a device substrate according to the present invention may further include a thermal treatment step after the film-forming step.

In the thermal treatment step, the film formed as a result of the film-forming step is thermally treated in a cooling step to a temperature lower than $T_{ODT}$ of the liquid material L2 including the first material and the second material to thereby allow the film to have a regular ordered structure. For example, the resulting film may have a micro phase separation structure including individual polymer phases (also referred to as block chain phases) having a lattice space of 100 nm or more. Preferably, the cooling step is performed on a film from which the solvent is removed in the drying step so as to further satisfactorily obtain the operation and advantages.

An electronic device, according to the present invention, includes the device substrate having the aforementioned configuration, and an optical device.

The device substrate having the aforementioned configuration includes a film having a reflection function and/or insulation function therein and does not require the formation of another film having such functions during the formation of the optical device on the device substrate. Namely, when the device substrate having the aforementioned configuration is used, a desired electronic device can be obtained by constructing a production line specialized to the production of the optical device alone, and the resulting electronic device can be provided at lower cost.

An exemplary method to produce an electronic device, according to the present invention, includes a element production step of forming an electronic element on a substrate; and a film-forming step of applying a mixture so as to cover at least a part of the electronic element to thereby form a film having a phase separation structure, the mixture including plural materials being immiscible with each other.

In the film-forming step in the method to produce an electronic device having this configuration, a film having a phase separation structure is formed by applying a coat of a mixture containing plural materials immiscible with each other so as to cover at least a part of the electronic element. Thus, the film-forming step does not require a vacuum process, in contrast to related art methods. The method can thereby reduce the production cost of electronic device.

The operation and advantages of not requiring a vacuum process are obtained by forming the film having a phase separation structure by a coating process in which the film is produced at atmospheric pressure and are not limited to the method to produce the electronic devices just mentioned above.

An exemplary method to produce an optical device, according to the present invention, includes an element production step of forming an electronic element layer including a switching device layer on a substrate, and a film-forming step of applying a mixture onto the electronic element layer by a liquid discharge process so as to form a film having a phase separation structure, the mixture including plural materials being immiscible with each other.

In the film-forming step in the method to produce an optical device having the above configuration, a mixture including plural materials immiscible with each other is applied onto the electronic element layer by a liquid discharge process to thereby form the film having a phase separation structure. Thus, the film-forming step does not require a vacuum process, in contrast to related art methods. The method can thereby reduce the production cost of the optical device.

Electronic apparatus, according to the present invention, includes at least the aforementioned electronic device or the aforementioned optical device.

The electronic apparatus having the above configuration has the electronic device or optical device with lower production cost than related art methods, and the resulting products can be obtained at lower cost than related art methods.

DETAILED DESCRIPTION OF PREFERRED EMBODIMENTS

Device Substrate

The device substrates, according to the present invention, will be illustrated in detail below with reference to FIGS. 1 to 7.

Figure 1:
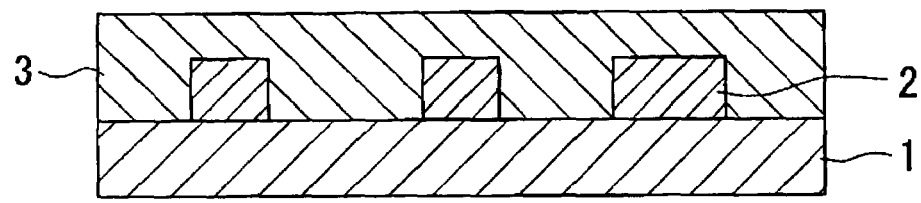
FIG. 1 is a schematic cross sectional view of a device substrate according to an exemplary embodiment of the present invention.
Figure 3:
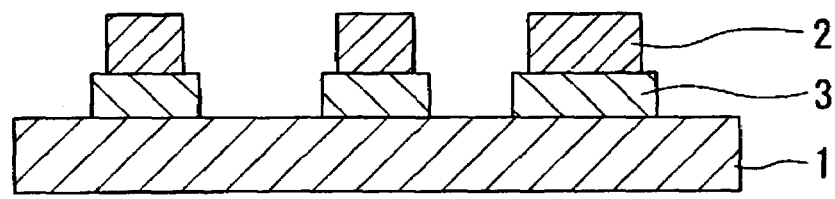
FIG. 3 is a schematic cross sectional view of a device substrate according to another exemplary embodiment of the present invention.

FIGS. 1 and 3 are each a schematic cross sectional view illustrating the first device substrate according to the present invention. The first device substrate includes a substrate 1, electronic elements 2 mounted above the substrate 1, and a film 3 having a phase separation structure and being arranged above the electronic elements 2 so as to cover at least a part of the substrate 1 or the electronic elements 2.

Specifically, FIG. 1 illustrates an example in which the film 3 having a phase separation structure is arranged so as to cover the substrate 1 and the electronic elements 2. In contrast, FIG. 3 illustrates an example in which the film 3 having a phase separation structure is arranged so as to cover at least a part of the substrate 1 or the electronic elements 2.

Figure 2:
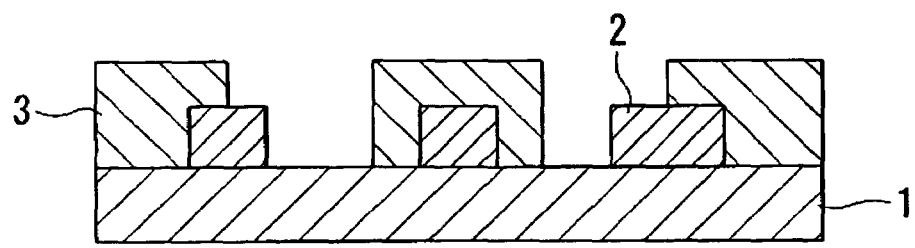
FIG. 2 is a schematic cross sectional view of a device substrate according to another exemplary embodiment of the present invention.
Figure 4:
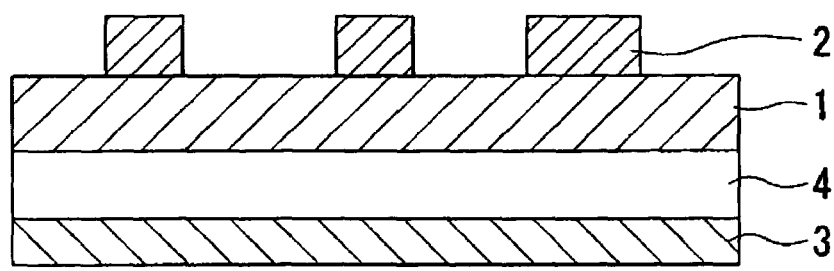
FIG. 4 is a schematic cross sectional view of a device substrate according to another exemplary embodiment of the present invention.

FIGS. 2 and 4 are each a schematic cross sectional view illustrating the second device substrate according to the present invention. The second device substrate includes a substrate 1, electronic elements 2 mounted above the substrate 1, and a film 3 having a phase separation structure and being arranged below the electronic elements 2.

Specifically, FIG. 2 illustrates and example in which the film 3, having a phase separation structure, is arranged so as to cover overall the substrate 1, and the electronic elements 2 are arranged on the film 3, respectively. In contrast, FIG. 4 illustrates an example in which the film 3, having a phase separation structure, is arranged so as to cover a part of the substrate 1, and the individual electronic elements 2 are arranged on the film 3, respectively.

However, when the film 3 having a phase separation structure is arranged in portions of the substrate 1 corresponding to the areas on which the electronic elements 2 are mounted, the arrangement is not specifically limited to one illustrated in FIG. 4. Specifically, the operation and advantages of arranging the film 3, having a phase separation structure according to the present invention, can be at least obtained only by arranging the film 3 so as to cover at least a part of the substrate 1 and/or the device 2. For example, when a plurality of the electronic element 2 is used, the film 3 having a phase separation structure can be arranged so as to correspond to at least one of the devices. Alternatively, the film 3 having a phase separation structure can be arranged so as to correspond to a partial area of the electronic element 2. When the film 3 having a phase separation structure is arranged in this manner, it is naturally arranged so as to cover at least a part of the substrate 1.

As a practical example of FIG. 4, the optical device to be arranged on the device substrate can be organic EL devices. In FIG. 4, the film 3, having a phase separation structure, is arranged between the plural electronic elements 2 and the substrate 1 so as to cover each bottom of the electronic elements 2, respectively. The optical devices will be arranged on the device susbtrate having this configuration. The film 3, having a phase separation structure, can thereby be used as reflective films having the most effective reflection function with respect to each wavelength of light emitted from each optical device. When such plural optical devices include those emitting red (R), or blue (B) light, respectively, plural pieces of the film 3, having a phase separation structure, are arranged as reflective films having a reflection function corresponding to wavelength of light emitted from each optical device so as to correspond to each optical device. In this case, the individual electronic elements 2 can be those for driving the individual optical devices, respectively.

Figure 5:
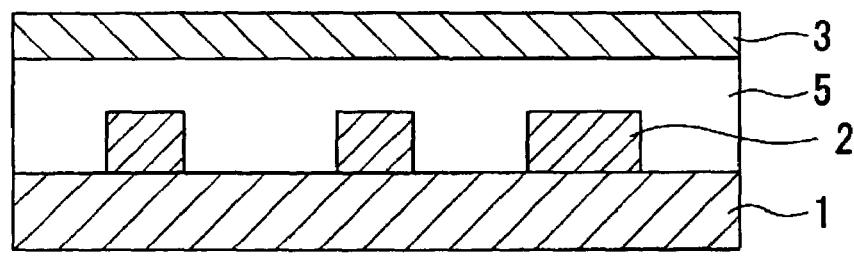
FIG. 5 is a schematic cross sectional view of a device substrate according to another exemplary embodiment of the present invention.
Figure 6:
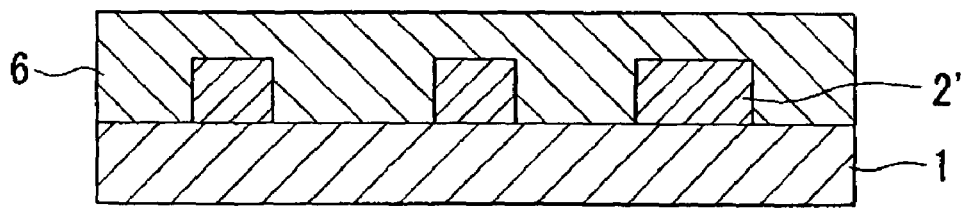
FIG. 6 is a schematic cross sectional view of a device substrate according to another exemplary embodiment of the present invention.

FIGS. 5 and 6 are each a schematic cross sectional view illustrating a modification of the first device substrate or the second device substrate, in which the film 3, having a phase separation structure constituting the device substrate, is arranged so as not to come in contact with the substrate 1.

Specifically, FIG. 5 illustrates an example in which the film 3, having a phase separation structure, is arranged on an opposite side of the substrate 1 to the electronic elements 2, and another layer or structure 4 than the devices is arranged between the substrate 1 and the film 3 having a phase separation structure. The configuration of FIG. 5 is illustrated by taking one including the structure 4 as an example. But the structure 4 can be naturally omitted in the configuration of FIG. 5. FIG. 6 illustrates an example in which the film 3, having a phase separation structure, is arranged on the same side of the substrate 1 with the electronic elements 2, and a layer or structure 5 other than the devices is arranged between the substrate 1 with the electronic elements 2 and the film 3 having a phase separation structure.

Figure 7:
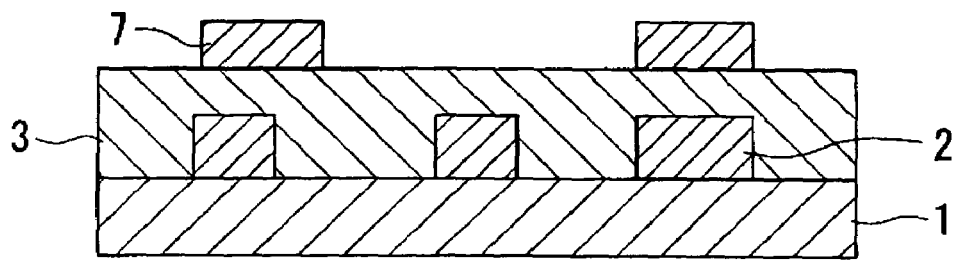
FIG. 7 is a schematic cross sectional view of a device substrate according to another exemplary embodiment of the present invention.

FIG. 7 is a schematic cross sectional view of a third device substrate according to the present invention. The third device substrate includes a substrate 1, electronic element layers 2' including plural switching devices and being arranged on the substrate 1, and an insulating film 6 having a phase separation structure and being arranged above the electronic element layers 2' so as to cover at least a part of the electronic element layer 2'.

In FIG. 7, the electronic element layers 2' may further include other structure(s) in addition to the electronic elements. Such other structures include, for example, parts to control the electronic elements and parts to drive the electronic elements.

The third device substrate includes the insulating film 6, having electrically insulating capability, as the film having a phase separation structure, in which the insulating film 6, having a phase separation structure, is arranged so as to cover at least a part of the electronic element layer 2'. FIG. 7 illustrates an example in which the insulating film 6, having a phase separation structure, is arranged so as to cover overall the substrate 1 and the electronic element layers 2'. However, the insulating film 6, having a phase separation structure, can naturally be arranged so as to selectively cover each electronic element layer 2' or to partially cover the electronic element layers 2'.

Figure 13:
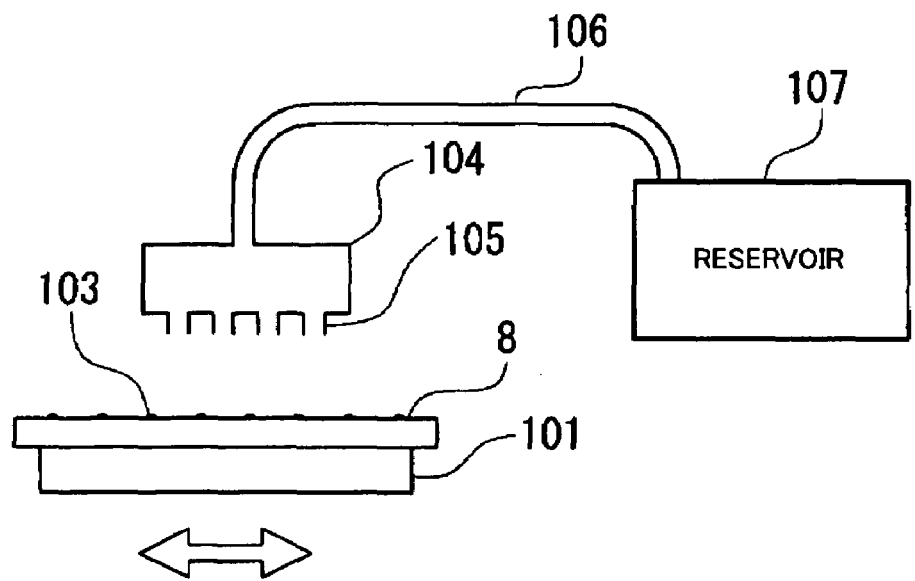
FIG. 13 is a schematic enlarged perspective view of a film having a phase separation structure according to the exemplary embodiment of the present invention.

FIG. 13 is a schematic enlarged perspective view of the film 3, having a phase separation structure, in which the film 3, having a phase separation structure, includes a material phase M1 and a material phase M2.

The material phases M1 and M2 include different materials that are immiscible with each other. Polymer structures (polymers) can be advantageously used as the material phases.

For example, the phase separation structure can be obtained by mixing the block copolymer, having a first constitutional repeating unit (first block) and a second constitutional repeating unit (second block), with a homopolymer (polymer structure) having one of the first or second constitutional repeating unit. The size or interval of individual phases in the phase separation structure can be set by appropriately selecting, for example, the type of the block copolymer and/or the amount of the homopolymer. In other words, the type of the block copolymer, the amount of the homopolymer, and other parameters can be selected depending on desired color(s).

Preferred block copolymers for the formation of the film 3 having a phase separation structure in the device substrate of the present exemplary embodiment include, for example, block copolymers including a polystyrene and a polyisoprene, and block copolymers including a poly(2-vinylpyridine) and a polyisoprene, as well as block copolymers including a poly(methyl methacrylate) (PMMA) and a polyisoprene or a polybutadiene. Among them, block copolymers and homopolymers that can be highly soluble in a used solvent are preferred.

In such block copolymers or graft copolymers, examples of aromatic-ring-containing polymer chains are polymer chains obtained by polymerizing at least one monomer selected from vinylnaphthalene, styrene, and derivatives thereof. Examples of acrylic polymer chains are poly(acrylic acid), poly(methyl methacrylate), poly(t-butyl methacrylate), and other polymer chains obtained by polymerizing at least one monomer selected from acrylic acid, methacrylic acid, crotonic acid, and derivatives thereof. As polyether chains, poly(alkylene oxide) chains such as poly(ethylene oxide), and poly(propylene oxide) are preferred. As polysilane chains, polydibutylsilane, and other dialkyl polysilane derivatives are preferred.

Examples of the combinations of block chains in the block copolymers or the graft copolymers are as follows.

The examples are combinations of: a polystyrene chain an a poly(methyl methacrylate) chain; a polystyrene chain and a poly(acrylic acid) chain; a polystyrene chain and a poly (ethylene oxide) chain; a polystyrene chain and a poly (propylene oxide) chain; a polystyrene chain and a polyphenylmethylsilane chain; a polystyrene chain and a polydibutylsilane chain; a polyvinylnaphthalene chain and a poly(methyl methacrylate) chain; a polyvinylnaphthalene chain and a poly(acrylic acid) chain; a polyvinylnaphthalene chain an a poly(ethylene oxide) chain; a polyvinylnaphthalene chain an a poly(propylene oxide) chain; a polyvinylnaphthalene chain and a polyphenylmethylsilane chain; and a polyvinylnaphthalene chain and a polydibutylsilane chain.

The device substrate having the film 3 having a phase separation structure is formed, for example, by the following exemplary method.

Initially, a block copolymer is mixed with a homopolymer that is miscible with one of the individual block chains (polymer chains) constituting the block copolymer to thereby yield a liquid material L1. The liquid material L1 is then melted by heating to a temperature equal to or higher than the "order-disorder transition temperature ($T_{ODT}$)" of the system of the block copolymer or is then dissolved in a common solvent to thereby yield a liquid material L2 which is completely blended and constitutes a disordered mixture.

The heated liquid material L2 is then cooled to a temperature equal to or lower than $T_{ODT}$ or the solvent is removed therefrom by evaporation to thereby yield a regular ordered structure. For example, the resulting structure may have a micro phase separation structure including individual polymer phases (block chain phases) having a lattice space of 100 nm or more.

According to the above method, the wavelength range of light, which the phase separation structure mainly reflects, can be changed by controlling the amount of the homopolymer to be incorporated, even when the same block copolymer is used. In addition, the wavelength range of light, which the phase separation structure mainly reflects, can be controlled within a broader range by increasing the molecular weight of the block copolymer.

The film 3 having a phase separation structure and constituting the device substrate of the present invention utilizes the above properties and is applied to, for example, configurations shown in FIGS. 1 to 7.

As is described above, the electronic elements 2, for use in the device substrates of the present invention, are transistors, diodes, and other devices having a switching function and exhibit their functions while emitting light outward. Examples of such devices are semiconductor devices for laser, light-emitting diodes, reflective liquid crystal devices, and EL devices.

For example, a transistor, a device having a switching function, can be used as the electronic elements 2 in FIG. 1. In FIG. 1, the film 3, having a phase separation structure, is arranged so as to cover overall the plural electronic elements 2 and the substrate 1. In practical use, plural optical devices, for example, are mounted on the film 3 having a phase separation structure constituting the outermost surface of the device substrate having this configuration. In this case, the film 3, having a phase separation structure, is used as a reflective film having a reflective function effective to all the wavelengths of radiation emitted from the individual optical devices. The plural electronic elements 2 can be, for example, functional devices to drive the individual optical devices.

The device substrate of FIG. 3 is different from the device substrate of FIG. 1 in that the film 3, having the phase separation structure, is arranged so as to cover at least a part of the substrate 1 and the electronic elements 2.

Owing to this difference, when plural optical devices, for example, are mounted on the device substrate, the device substrate of FIG. 3 can have conduction areas, insulating areas, and light-path areas having appropriately modified structural and/or materials corresponding to the individual optical devices. The resulting device substrate can carry different optical devices having different specifications concurrently thereon.

A transistor, a device having a switching function, can also be used as the electronic elements 2 in FIG. 2. The film 3 having a phase separation structure in FIG. 2 is arranged between the plural electronic elements 2 and the substrate 1 so as to cover all the electronic elements 2. In practical use, for example, plural optical devices are mounted on the electronic elements 2 constituting the outermost surface of the device substrate. In this case, the film 3, having a phase separation structure, is used as a reflective film having a reflection function effective to all the wavelengths of light emitted from the individual optical devices. The plural electronic elements 2 can be, for example, functional devices to drive, the individual optical devices.

The device substrate of FIG. 4 is different from the device substrate of FIG. 2 in that the film 3 having a phase separation structure is arranged only between the individual electronic elements 2 and the substrate 1.

Owing to this difference, when, for example, optical devices are respectively mounted on the individual electronic elements 2, the device substrate of FIG. 4 can have the films 3, having a phase separation structure, as reflective films each having reflection properties corresponding to the individual optical devices.

The aforementioned film 3, having a phase separation structure, has a function as a reflective film and can provide a device substrate having similar reflection functions, even when the device substrate has a layer or structure 4 or 5 other than the devices between the substrate 1 with the electronic elements 2 and the film 3 having a phase separation structure.

Even when the device substrate has a configuration as shown in FIG. 7 including the electronic element layer 2' instead of the electronic elements 2 in FIG. 1, the film 3 having a phase separation structure can naturally exhibit reflection functions similar to that in FIG. 1.

Figure 8:
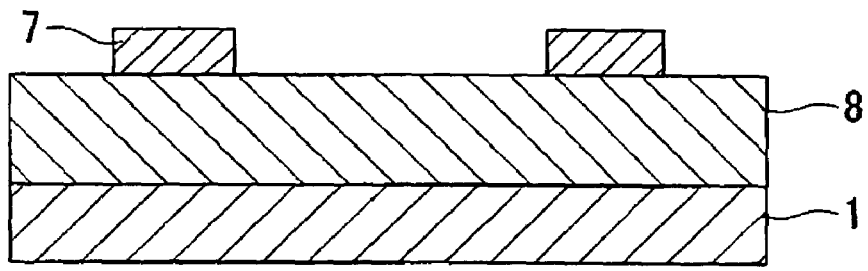
FIG. 8 is a schematic cross sectional view of an electronic device according to another exemplary embodiment of the present invention.

FIG. 8 is a schematic cross sectional view of an electronic device according to the present invention, in which the electronic device includes the device substrate having the aforementioned configuration, and optical devices.

With reference to FIG. 8, the device substrate includes a substrate 1, electronic elements 2, and a film 3 having a phase separation structure, and optical devices 7 are mounted on the device substrate.

According to this configuration, the device substrate previously has the electronic elements 2 inside thereof. For example, when electronic elements having the function of driving the optical devices 7 are used as the electronic elements 2, the optical devices 7 can exhibit their functions only by mounting them on the device substrate.

The film 3, having a phase separation structure, can also have an insulating function by appropriately selecting materials constituting the film and can thereby be used as the insulating film 6 as shown in FIG. 7.

The film 3, having a phase separation structure, can also serve as an interlayer insulator when the optical devices comprising the organic EL devices are arranged over the electronic elements 2 serving as a driving circuit for the operation of the optical devices as illustrated in FIG. 8.

The film 3, having a phase separation structure, can be obtained as a phase separation structure such as "spherical", "cylindrical", "lamellar" or "biocontinuous" structure, depending on the volume fraction of the individual block chain phases (polymer phases) including the incorporated homopolymer and can be of any structure from the viewpoint of the light reflection function. For example, a biocontinuous structure can be obtained when the volume fraction $\Phi$ of any of the polymer phases is about 0.33, and a cylindrical structure can be obtained when the volume fraction $\Phi$ is more than about 0.18 and less than about 0.32.

As is described above, the device substrates, according to the present invention, can have a phase separation structure capable of serving as an insulating material constituting an interlayer insulator and also serving as a reflective-material constituting a reflective layer against light emitted from devices. Accordingly, only by replacing a related art interlayer insulator with the film 3, having a phase separation structure, a film having both an insulating function and a reflection function can be obtained as the most simple layer configuration of a single-layer structure.

In contrast, FIGS. 6 and 7 illustrate device substrates in which a film 3, having a phase separation structure, is arranged outside a substrate 1 and electronic elements 2.

In the device substrate of FIG. 5, the film 3, having a phase separation structure, is arranged below the substrate 1, on an opposite side to the devices 2 so as to cover the entire side of the substrate 1 but not to come in contact with the substrate 1. In contrast, in the device substrate of FIG. 6, the film 3, having a phase separation structure, is arranged above the susbtrate 1 on the same side with the devices 2 so as to cover the entire side of the substrate 1, but not to come in contact with the substrate 1. Components 4 and 5 illustrated herein are each a film or structure other than the electronic elements 2.

Specifically, the film 3, having a phase separation structure in the device substrates of FIGS. 5 and 6, serves as a reflective film against light emitted from the electronic elements 2 and passed through the other film or structure 4 or 5.

In addition, the film 3, having a phase separation structure in the device substrates of FIGS. 5 and 6, can also have an insulating function by appropriately selecting materials constituting the film and can thereby promisingly serve as an insulating film that protects the substrate 1 and/or the devices 2 from static electricity and/or external force.

METHODS FOR PRODUCING DEVICE SUBSTRATES

Next, an exemplary method to form the film 3, having a phase separation structure (first film) on the substrate 1, in the device substrate having the configuration shown in FIG. 1 will be illustrated, as an example of the methods to produce a device substrate according to the present invention.

Any device can be used as an device to form the film 3 having a phase separation structure, as long as it forms a film by a coating process such as spring coating, dip coating or ink jet process.

Figure 14:
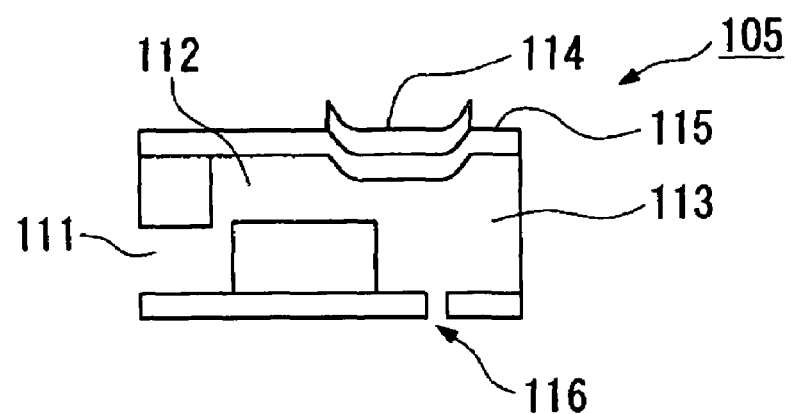
FIG. 14 is a schematic of a liquid coating device for the formation of the film having a phase separation structure according to the exemplary embodiments of the present invention.

In the following method illustrated in detail, the film 3 having a phase separation structure is formed on a transparent substrate including a glass member (#7059, available from Coating Works, refractive index: 1.53) using a device to coat a liquid material shown in FIGS. 14 to 16.

With reference to FIG. 13, the substrate 8 is held on a stage 101 by vacuum attachment. The liquid material L2 is supplied from a reservoir 107 via a supply tube 106 to a dispenser head 104. The liquid material L2 is further applied from plural nozzles 105 arranged on the dispenser head 104 onto the substrate 8 as a myriad of dots 103.

Figure 15:
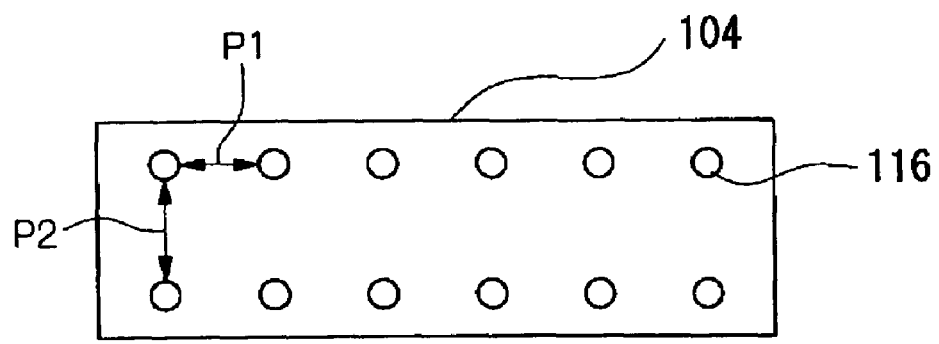
FIG. 15 is an enlarged view of a part of the liquid coating device shown in FIG. 14.

FIG. 15 is a detailed cross sectional view of the nozzles 105 constituting discharge ports through which the liquid material L2 is discharged from the dispenser head 104.

The dispenser head 104, shown in FIG. 15, has a configuration similar to that of a head in a printer of material discharge system and can discharge the liquid material L2 by action of vibration of a piezoelectric device. The liquid material L2 moves from an inlet 111 via a supply port 112 into a cavity 113. The piezoelectric device 114, in intimate contact with a diaphragm 115 expands and contracts to move the diaphragm 115, so thereby decrease or increase the volume of the cavity 113. The liquid material L2 is discharged through a nozzle orifice when the volume of the cavity 113 decreases, and is applied from the supply port 112 to the cavity 113 when the volume of the cavity 113 increases.

Figure 16:
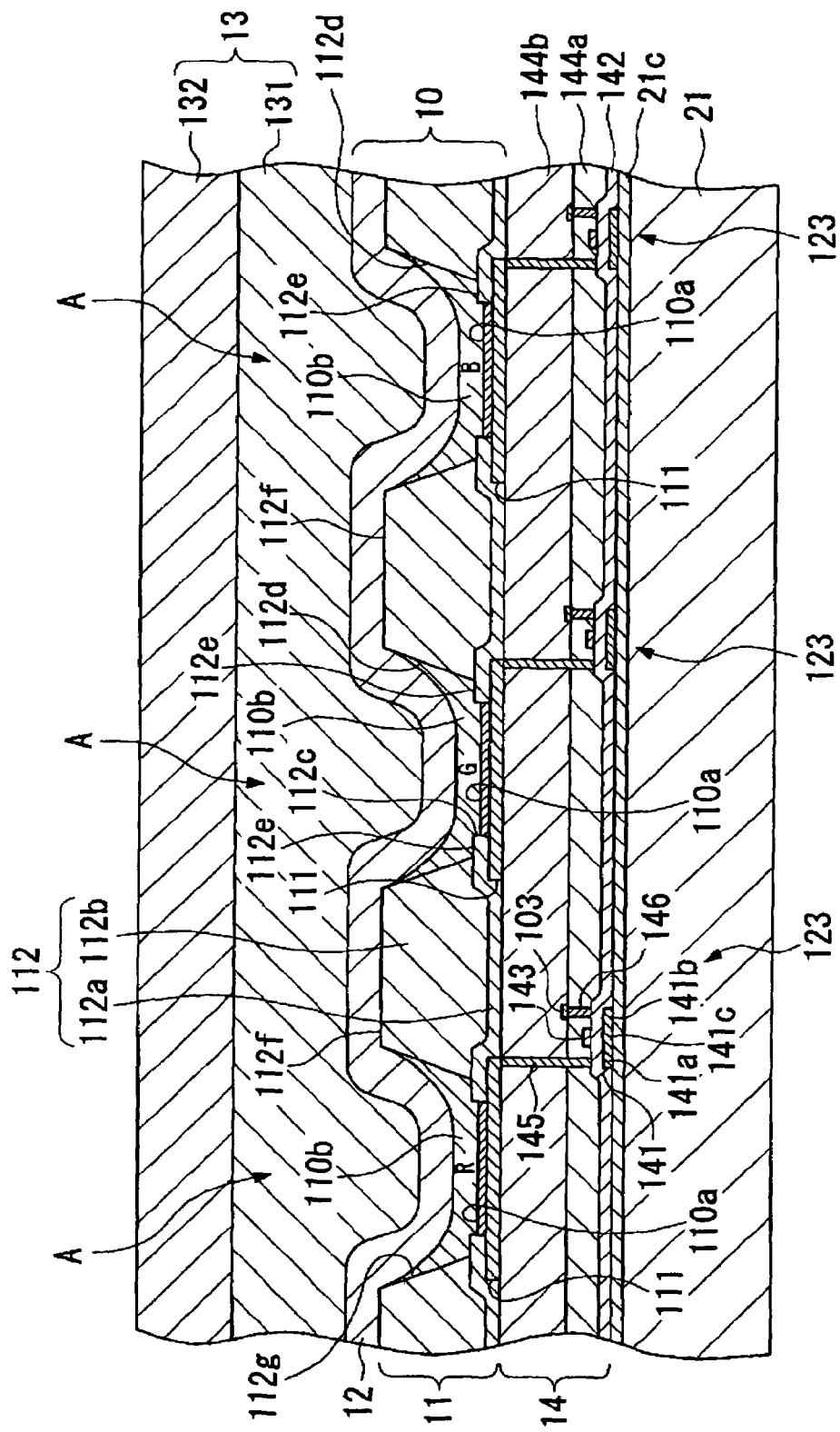
FIG. 16 is an enlarged view of another part of the liquid coating device shown in FIG. 14.

A plurality of the nozzle orifice 116 is arranged, for example, two-dimensionally as shown in FIG. 16. Accordingly, the liquid material can be applied in dots to a desired position on the substrate by relatively moving the substrate 8 or the dispenser head 104 as shown in FIG. 14.

With reference to FIG. 16, the dispenser head 104 for use herein, preferably has a lateral pitch P1 of the nozzle orifices 116 of several hundred micrometers and a vertical pitch P2 of the nozzle orifices 116 of several millimeters. The nozzle orifices 116 each have an aperture of, for example, several ten micrometers to several hundred micrometers. The liquid material is discharged, in an amount of several ten nanograms to several hundred nanograms, each time as droplets, each having a diameter of several ten micrometers to several hundred micrometers.

The liquid material L2 applied in dots is substantially a sphere with a size of several hundred micrometers immediately after discharging from the nozzles 105. The thickness of the resulting coated film can be controlled by adjusting the aperture of the nozzle orifices 116 and the pitch of dots 103.

The aperture of the nozzle orifices 116 can be further decreased. In this case, the liquid material can be patterned in lines, for example, about 10 to about 20 µm wide to thereby achieve direct drawing which does not require a photolithographic process.

The liquid material L2 is applied by the aforementioned liquid coating process of a liquid discharge system, i.e., "ink jet system". This coating process can use a device having a simple configuration available at very low cost, as compared with related art film-forming methods using film-forming device such as a CVD device using a vacuum process. Such a device for use in the coating process for the liquid material L2 can form films at atmospheric pressure, can thereby exhibit higher throughput, can be maintained more easily and can thereby be operated with a higher availability, as compared with film-forming device such as a CVD device which forms films under reduced pressure.

The above exemplified method to produce the film 3, having a phase separation structure, uses the ink jet process. However, the film 3, having a phase separation structure can be produced by any process not limited to the ink jet process, as long as it is a coating process. For example, the film 3, having a phase separation structure, can be produced by spin coating or any other conventional coating process. In this connection, the ink jet process can utilize the liquid material L2 at a utilization rate of 50% or more, whereas the conventional spin coating process utilizes the liquid material L2 at a utilization rate of several percent or less.

The aforementioned material discharge system can form the film 3, having a phase separation structure, and can also be applied to the formation of transparent electrodes made of an ITO film for use as anodes or cathodes constituting organic EL devices, and for the formation of light-emitting layers constituting such organic EL devices. Thus, the system can much effectively reduce the cost of electronic device such as organic EL device.

OPTICAL DEVICE AND PRODUCTION METHODS THEREOF

Examples of the optical device according to the present invention are those shown in FIGS. 9 to 12, and FIG. 17.

Figure 9:
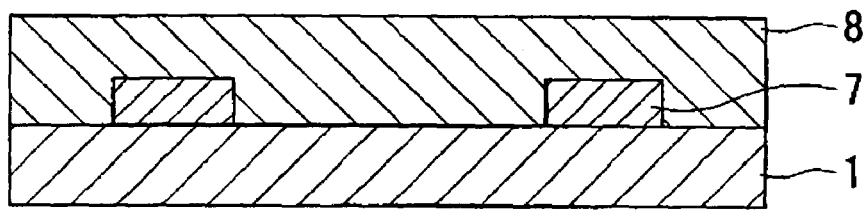
FIG. 9 is a schematic cross sectional view of an optical device according to another exemplary embodiment of the present invention.
Figure 10:
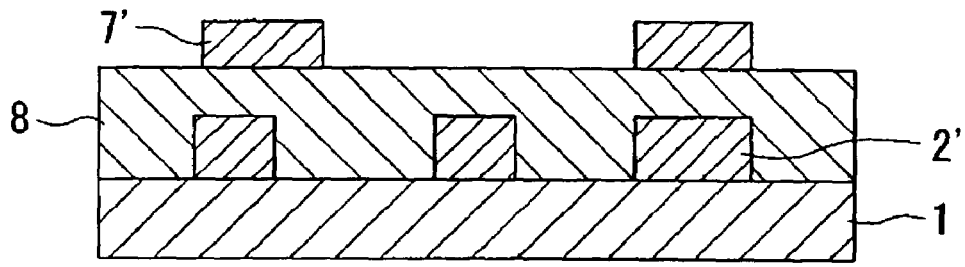
FIG. 10 is a schematic cross sectional view of an optical device according to another exemplary embodiment of the present invention.

FIGS. 9 and 10 show a first optical device. The first optical device includes a substrate 1, optical devices 7 mounted above the substrate 1, and a reflective film 8 having a phase separation structure on a side opposite to the light extracting direction with respect to the optical devices 7. FIG. 10 illustrates an example in which the reflective film 8 is arranged between the substrate 1 and the optical devices 7, and FIG. 10 illustrates another example in which the reflective film 8 is arranged above the substrate 1 and the optical devices 7.

Figure 11:
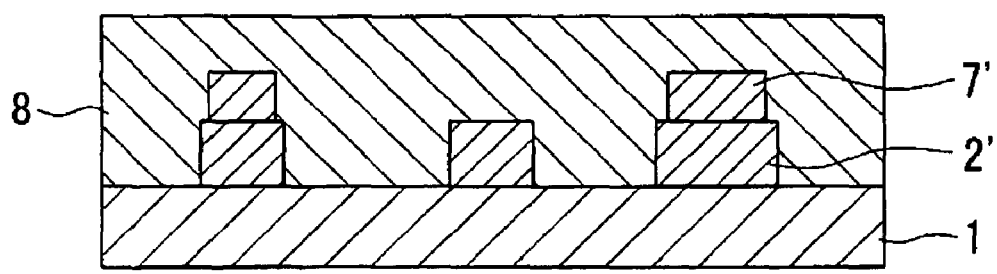
FIG. 11 is a schematic cross sectional view of an optical device according to another exemplary embodiment of the present invention.
Figure 12:
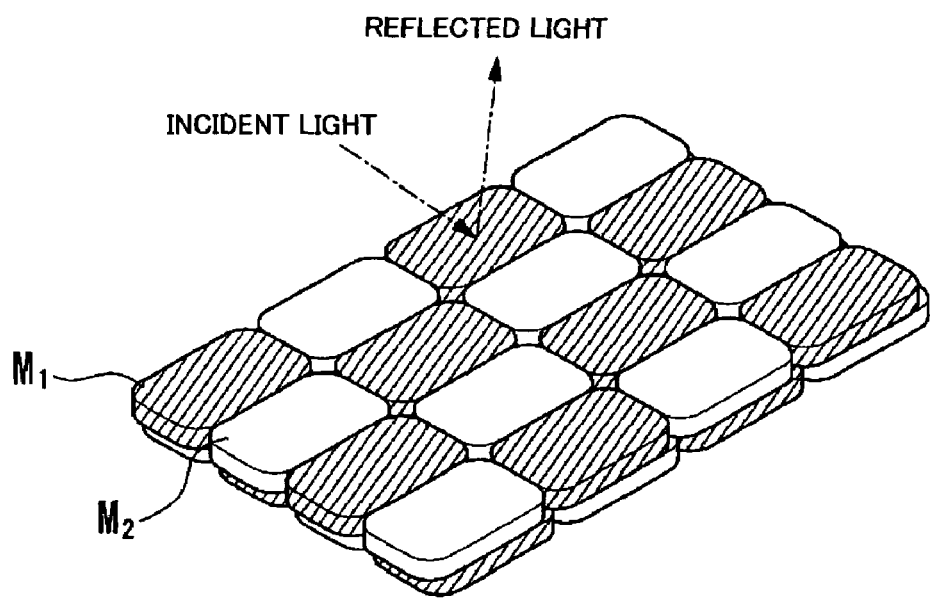
FIG. 12 is a schematic cross sectional view of an optical device according to another exemplary embodiment of the present invention.

An optical device shown in FIG. 11 includes a substrate 1, plural-electronic element layers 2' arranged above the substrate 1 and including a switching device, a reflective film 8 arranged above the electronic element layers 2' and having a phase separation structure, and optical device layers 7' arranged above the reflective film 8.

An optical device shown in FIG. 11 includes a substrate 1, plural electronic element layers 2' arranged above the substrate 1 and including a switching device, optical device layers 7' arranged above the electronic element layers 2', and a reflective film 8 arranged above the optical device layers 7' and having a phase separation structure.

A concrete example of the optical device in which an organic EL device is used as the optical device 7 will be illustrated in detail below, with reference to FIG. 17.

Figure 17:
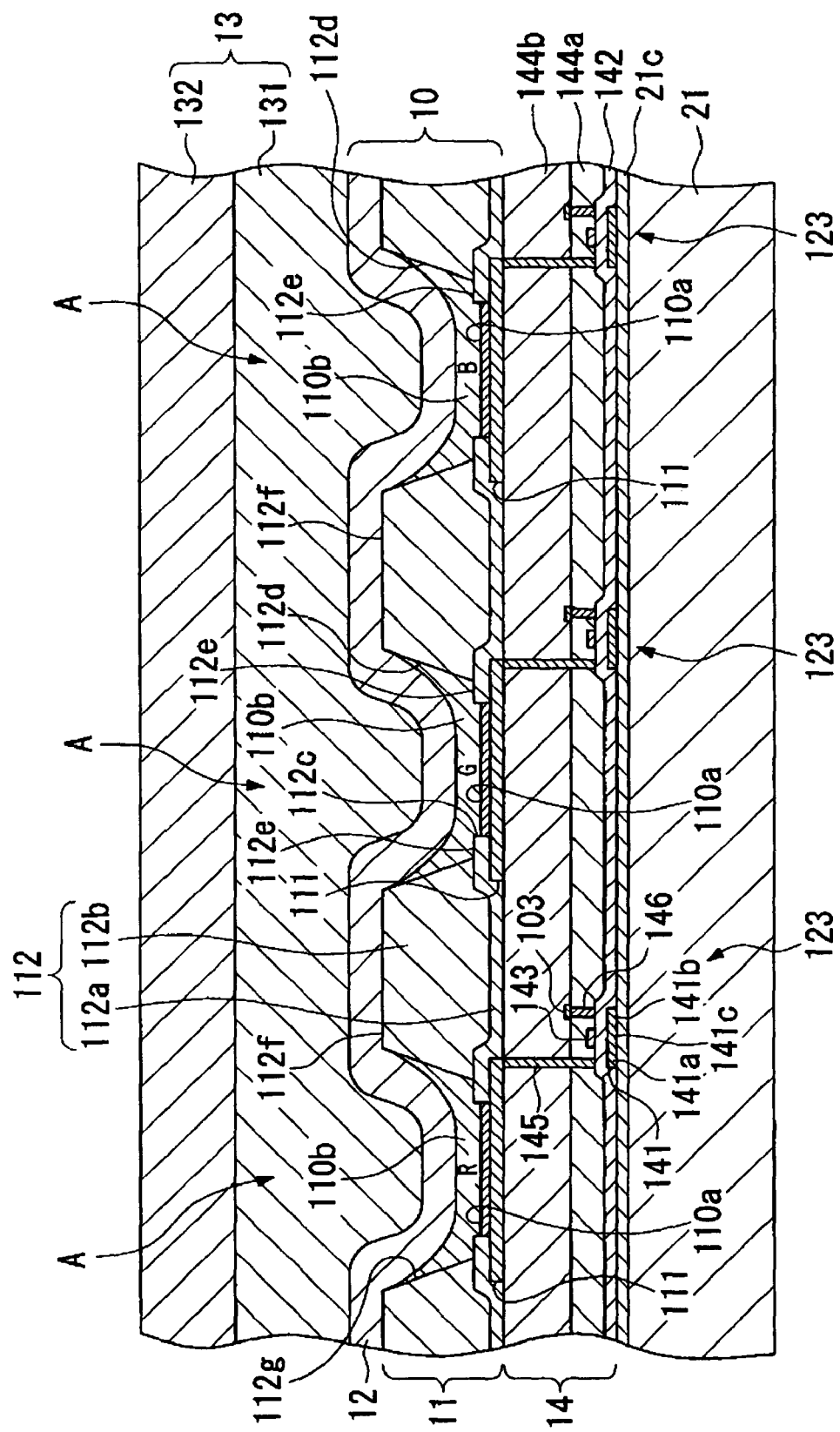
FIG. 17 is a schematic enlarged view of a sectional structure of display areas in the optical device according to an exemplary embodiment of the present invention.

FIG. 17 is a schematic enlarged view of the sectional structure of display areas in an electronic device and illustrates three pixel areas A. The electronic device 20 structurally includes a substrate 21, and, a circuit device unit 14, a light-emitting device unit 11, and a sealing unit 13 sequentially arranged on the substrate 21. The circuit device unit 14 includes, for example, TFT's and other circuits, and two interlayer insulators 144a and 144b. The light-emitting device unit 11 includes, for example, a pixel electrode 111, a functional layer 110 and a cathode 12. The sealing unit 13 includes a sealing resin 131 and a sealing substrate 132.

In the electronic device 20 of FIG. 17, the substrate 21 corresponds to the substrate 1 in FIG. 1, and the layer having a phase separation structure according to the present invention is used as the second interlayer insulator 144b.

In the electronic device 20, light emitted from the functional layer 110 toward the cathode 12 passes through the sealing unit 13 and exits to above the sealing unit 13 (toward an observer). In addition, light emitted from the functional layer 110 toward the substrate 21 is reflected by the second interlayer insulator 144b, passes through the sealing unit 13 and exits to above the sealing unit 13 (toward the observer).

In the electrode device 20 of the present invention, the second interlayer insulator 144b includes the layer having a phase separation structure and can thereby have a reflection function in addition to an insulation function.

Thus, both the pixel electrode 111 and the cathode 12 constituting the light-emitting device unit 11, can be formed from the same transparent conductive material, and the functional layer 110 sandwiched between the pixel electrode 111 and the cathode 12 receives internal stress to an equal extent at upper and lower interfaces. In other words, the levels of the internal stress which the functional layer 110 receives from its upper and lower layers are substantially equal, and the strain inside the functional layer 110 can be minimized. As a result of minimization of the strain, the functional layer 110 can emit light with a stable intensity for a long time.

The layer having a phase separation structure and constituting the second interlayer insulator 144b, can include materials described in the film 3, having a phase separation structure illustrated in FIGS. 1 to 4. Consequently, the second interlayer insulator 144b including the layer having a phase separation structure is preferably produced by a method using the ink jet process using the liquid material L2 containing the first material and the second material. The first and second materials herein are selected from the aforementioned materials.

When films, each having a phase separation structure and corresponding to R (red), G (green), and B (blue) colors, are separately formed as the second interlayer insulator 144b, they are preferably formed by the ink jet process is mentioned above. However, when one film, having a phase separation structure, is formed in common among R, G, and B colors as the second interlayer insulator 144b, it can be produced by any process not specifically limited to the ink jet process. For example, a white film having a phase separation structure can reflect all colors, and in this case, the production process is not specifically limited to the ink jet process.

The liquid material L2 containing the first material and the second material as used herein, means a liquid material prepared in the following manner. Initially, a block copolymer constituting the first material is mixed with, as the second material, a homopolymer that is miscible with one of the individual block chains (also referred to as polymer chains) constituting the block copolymer to thereby yield a liquid material L1. The liquid material L1 is then melted by heating to a temperature equal to or higher than the "order-disorder transition temperate ($T_{ODT}$)" of the system of the block copolymer or is then dissolved in a solvent common to the first material and the second material to thereby yield the liquid material L2 which is completely blended and constitutes a disordered mixture.

The method to produce a device substrate, according to the present invention, uses a substrate for use in the mounting of a device on one side and includes a coating step to form a film having a phase separation structure and including a first material and a second material that are immiscible with each other to a position in the substrate, so as to cover at least the device.

The method has only to use the liquid material L2 and to include the coating step to form a film to position in the substrate so as to cover at least the device, which film has a phase separation structure and includes a first material and a second material that are immiscible with each other. Thus, the method can form a reflective film having a desired insulation function and reflection function at any desired position in the substrate so as to cover an optimum region.

The method to produce a device substrate can form a desired film by the coating step, can thereby form a film under atmospheric conditions, does not require expensive facilities corresponding to a vacuum process and can thereby significantly reduce the production cost of such films, in contrast to related art production methods requiring a vacuum process.

The production cost can be further significantly be reduced by employing a process of separately applying the first material and the second material to different portions by the ink jet process and thus forming a film constituting a reflective film having both the insulation function and the reflection function in the coating step. This is for the following reasons.

A first reason is that the material discharge process (ink jet process), using the liquid material L2, does not require expensive film-forcing device such as CVD device, can thereby use simplified production device and steps can use low-cost production lines, in contrast to the related art vacuum process.

A second reason is as follows. By using the liquid material L2, even the spin coating process, a related art coating process, can form a film having a phase separation structure and including the first material and the second material immiscible with each other according to the present invention. However, the ink jet process can utilize the liquid material L2 at a utilization rate of 50% or more, whereas the related art spin coating process utilizes the liquid material L2 at a utilization rate of several percent or less.

A third reason is as follows. When the method further includes the step of forming an ITO film as a transparent conductive material prior to or after the forming step of the film, having a phase separation structure, the ink jet process can also be employed for the formation of the ITO film. Thus, the method can employ continuous production steps under atmospheric conditions, thus further reducing the production cost.

In the above coating step, the first material and the second material are separately applied to different portions by the ink jet process to thereby form a film, constituting a reflective film, having both the insulation function and reflection function. The resulting film can include the first material and the second material in different portions, for example, by discharging the first material and the second material through the nozzle orifices so as to arrange a fine area including one of the two materials adjacent to another fine area including the other material, or by controlling the position of an ink jet head having the nozzle orifices. In this case, a coating process of intermittently applying these materials to different portions, to form a film, is preferably employed, since the discharge amounts of the first material and the second material can be controlled highly precisely to thereby yield a film having a uniform thickness.

In addition, the film, having a phase separation structure, and including the first material and the second material that are immiscible with each other, can be easily formed at a desired position by applying the first material and the second material separately to different portions by the ink jet process, to thereby form the film having both the insulation function and reflection function.

The method to produce a device substrate may further include a drying step to remove the solvent posterior to the coating step.

In the drying step to remove the solvent, the solvent is evaporated and thereby removed from the film formed in the coating step to thereby allow the film to have a regular ordered structure. For example, the resulting film may have a micro phase separation structure including individual polymer phases (also referred to as block chain phases) having a lattice space of 100 nm or more. The drying step can be performed under reduced pressure so as to remove the solvent from the film more efficiently.

The method to produce a device substrate according to the present invention may further include a cooling step to subject the article to a thermal treatment posterior to the coating step or the drying step.

The cooling step means a thermal treatment step to cool the film formed in the coating step to a temperature lower than $T_{ODT}$ of the liquid material L2 including the first material and the second material. The cooling step allows the film to have a regular ordered structure to thereby form a film having a micro phase separation structure including polymer phases (also referred to as block chain phases) having, for example, a lattice space of 100 nm or more. In particular, the operation and advantages can further be increased by subjecting the film to the drying step to thereby remove the solvent therefrom and then subjecting the film to the cooling step.

The pixel electrode 111 and the cathode 12 can include a transparent conductive material to thereby allow the emitted light to pass therethrough. Such transparent conductive materials include, for example, ITO, Pt, Ir, Ni, and Pd, of which ITO is preferred, since an ITO film can be formed by the ink jet process as in the second interlayer insulator 144b.

The circuit device unit 14 includes an underlayer protective film 21c including a silicon oxide film arranged on the substrate 21, and an island-like semiconductor film 141 including a polycrystalline silicon and arranged on the underlayer protective film 21C. The semiconductor film 141 includes a source region 141a and drain region 141b formed by high-density P ion implantation. A region to which P is not implanted constitutes a channel region 141c.

A transparent gate insulator 142 is arranged in the circuit device unit 14 so as to cover the underlayer protective film 21c and the semiconductor film 141. A gate electrode 143 (scanning line 101) including, for example, Al, Mo, Ta, Ti, or W is arranged on the gate insulator 142, and the transparent first interlayer insulator 144a and the second interlayer insulator 144b are arranged on the gate electrode 143 and the gate insulator 142. The gate electrode 143 is arranged at a position corresponding to the channel region 141c of the semiconductor film 141.

Contact holes 145 and 146 passing through the first interlayer insulator 144a and the second interlayer insulator 144b are connected to the source region 141a and the drain region 141b of the semiconductor film 141.

The patterned transparent pixel electrode 111 having a predetermined shape and including, for example, ITO is arranged on the second interlayer insulator 144b, and the contact hole 145 is connected to the pixel electrode 111.

The other contact hole 146 is connected to a source line 103.

Thus, thin film transistors 123 are arranged in the circuit device unit 14 and are connected to the individual pixel electrodes 111 for their driving.

The circuit device unit 14 may include a retention capacitor cap and thin film transistors for switching, but these components are omitted in FIG. 17.

With reference to FIG. 17, the light-emitting device unit 11 mainly includes the plural pixel electrodes 111, the functional layers 110 respectively laminated on the plural pixel electrode 111, a bank 112 arranged between the pixel electrodes 111 and functional layers 110 to thereby separate the individual functional layers 110, and the cathode 12 arranged on the functional layers 110. These pixel electrodes 111, the functional layers 110 and the cathode 12 constitute light-emitting devices.

The pixel electrodes 111 are formed from, for example, ITO and are patterned to be substantially rectangular when viewed from above.

With reference to FIG. 17, the bank 112 includes a laminated assemblage of an inorganic bank layer 112a (also referred to as a first bank layer) located near to the substrate 21, and an organic bank layer 112b (also referred to as a second bank layer) positioned distant from the substrate 21.

The inorganic bank layer 112a and the organic bank layer 112b are arranged so as to overlap onto the peripheries of the pixel electrodes 111. When viewed from above, the periphery of the pixel electrode 111 and the inorganic bank layer 112a overlap with each other. Likewise, the organic bank layer 112b and the pixel electrode 111 overlay with each other when viewed from above. The inorganic bank layer 112a arranged around the center of the pixel electrode 111 so as to have a smaller area than that of the organic bank layer 112b. Thus, each first laminate 112c of the inorganic bank layer 112a is arranged inside the pixel electrode 111 to thereby form a lower opening 112c corresponding to a position at which the pixel electrode 111 is arranged.

The organic bank layer 112b has an upper opening 112d. The upper opening 112d is arranged so as to correspond to the position at which the pixel electrode 111 is arranged and to the lower opening 112c. With reference to FIG. 17, the upper opening 112d has an are greater than that of the lower opening 112c and less than that of the pixel electrode 111. In some cases, the top of the upper opening 112d and the edge of the pixel electrode 111 are substantially in flush with each other. In such cases, the upper opening 112d of the organic bank layer 112b has an inclined cross section as illustrated in FIG. 17.

The bank 112 may include an opening 112g penetrating the inorganic bank layer 112a and the organic bank layer 112b and being formed by communicating the lower opening 112c and the upper opening 112d.

The inorganic bank layer 112a preferably may include an inorganic material such as $SiO_2$ and $TiO_2$.

The thickness of the inorganic bank layer 112a is preferably within a range from 50 to 200 nm and more preferably around 150 nm. If the thickness is less than 50 nm, the resulting inorganic bank layer 112a may be thinner than a hole injection-transportation layer 110a mentioned later, thus failing to ensure the flatness of the hole injection-transportation layer 110a. If it exceeds 200 nm, a step formed by the lower opening 112c may be large, thus failing to ensure the flatness of a light-emitting layer 110b mentioned later, which is laminated on the hole injection-transportation layer 110a.

The organic bank layer 112b preferably includes acrylic resins, polyimide resins, and other materials having heat resistance and solvent resistance.

The thickness of the organic bank layer 112b is preferably within a range from 0.1 to 3.5 μm and more preferably around 2 μm. If the thickness is less than 0.1 μm, the resulting organic bank layer 112b is thinner than the total of the hole injection-transportation layer and the light-emitting layer mentioned later, and the light-emitting layer may extend off the upper opening 112d. If it exceeds 3.5 μm, a step formed by the upper opening 112d may be large, thus failing to ensure the step coverage of the cathode 12 arranged on the organic bank layer 112b. The thickness of the organic bank layer 112b is more preferably 2 μm or more to thereby more satisfactorily insulate from the thin film transistor 123 for driving.

The functional layer 110 includes the hole injection-transportation layer 110a laminated on the pixel electrode 111, and the light-emitting layer 110b arranged adjacent onto the hole injection-transportation layer 110a. The electronic device may further include another functional layer having another function, such as electron injection-transportation layer, adjacent to the light-emitting layer 110b.

The hole injection-transportation layer 110a is capable of injecting holes into the light-emitting layer 110b and is capable of transporting the holes in the hole injection-transportation layer 110a. By arranging the hole injection-transportation layer 110a between the pixel electrode 111 and the light-emitting layer 110b, the light-emitting layer 110b can have improved device properties such as luminous efficiency and life. In the light-emitting layer 110b, holes injected from the hole injection-transportation layer 110a and electrons injected from the cathode 12 are re-combined to thereby emit light.

The light-emitting layer 110b includes three light-emitting layers, i.e., a red light-emitting layer 110b1 emitting red light (R), a green light-emitting layer 110b2 emitting green light (G), and a blue light-emitting layer 110b3 emitting blue light (B). These light-emitting layers 110b1, 110b2, and 110b3 are arranged in stripe.

The cathode 12 is arranged overall the light-emitting device unit 11, pairs up with the pixel electrode 111 facing with each other and plays a role to allow a current to pass into the functional layer 110. The cathode 12 can include a transparent conductive material as in the pixel electrodes. Materials for constituting the cathode 12 include, for example, ITO, Pt, Ir, Ni, Mg, Ag, and Pd, of which ITO is typically preferred, since a coat of ITO can be formed by the ink jet process.

The sealing unit 13 including the sealing resin 131 and the sealing substrate 132 is arranged on the cathode 12. The sealing unit 13 is arranged overall the cathode 12 so as to protect the display device unit 10 from oxidation and/or from damage caused by external force.

The electronic device 20 according to the present invention has the above configuration.

The aforementioned electronic device 20 has been illustrated in detail by taking an example, in which the film having a phase separation structure shown in FIG. 1 is applied to the second interlayer insulator 144b in FIG. 17. Specifically, in this example, the film, having a phase separation structure according to the present invention, is arranged so as to cover overall the substrate 21 and to be positioned below the plural light-emitting devices.

Similar operation and advantages can also naturally be obtained when the film, having a phase separation structure according to the present invention, is arranged only in regions corresponding to those on which devices are mounted, as shown in FIG. 4. Specifically, by taking the electronic device shown in FIG. 17 as an example, the film having a phase separation structure according to the present invention, can be arranged in portions alone in which the second interlayer insulator 144b comes in contact with the pixel electrodes 111.

The film, having a phase separation structure according to the present invention, can be arranged outside the substrate 21 in FIG. 17 (lower side in the figure) so as to utilize its reflection function. This arrangement corresponds to the configuration illustrated in FIG. 5.

The film, having a phase separation structure according to the present invention can also be arranged even when the traveling direction of light emitted from the functional layer 110 of the electronic device 20 is opposite to that mentioned above.

In the electronic device 20 just mentioned above, light emitted from the functional layer 110 toward the substrate 21 passes through the circuit device unit 14 and the substrate 21 and exits toward below the substrate 21 (toward an observer), and light emitted from the functional layer 110 toward an opposite direction to the substrate 21 passes through the cathode 12, is reflected by the sealing unit 13, passes through the circuit device unit 14 and the substrate 21 and exits toward below the substrate 21 (toward the observer).

When light emitted from the functional layer 110 exits toward below the substrate 21 (toward the observer) as mentioned above, the film having a phase separation structure according to the present invention can be arranged, for example, instead of the sealing resin 131 constituting the sealing unit 13. The film having a phase separation structure can also be arranged in addition to the sealing layer including the sealing resin 131. This arrangement corresponds to the configuration shown in FIG. 6.

ELECTRONIC APPARATUS

The electronic apparatus according to the present invention includes the aforementioned electronic device or the aforementioned optical device. Examples of the electronic apparatus having the configuration will be illustrated below, with reference to each of FIGS. 18 to 20.

Figure 18:
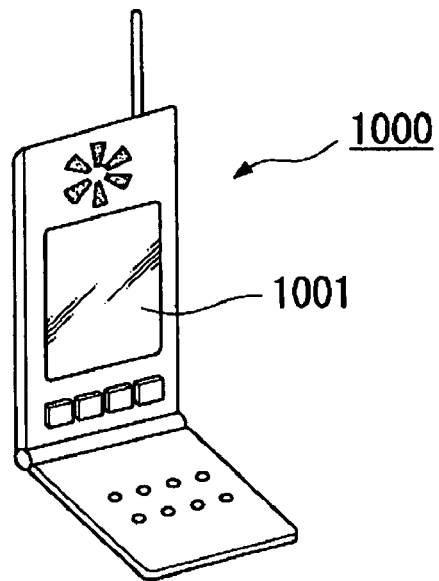
FIG. 18 is a perspective view of an example of electronic apparatus including the electronic device or optical device according to an exemplary embodiment of the present invention.

FIG. 18 is a perspective view of an example of mobile phones. FIG. 18 shows a mobile phone main body 1000 and a display unit 1001 using the electronic device.

Figure 19:
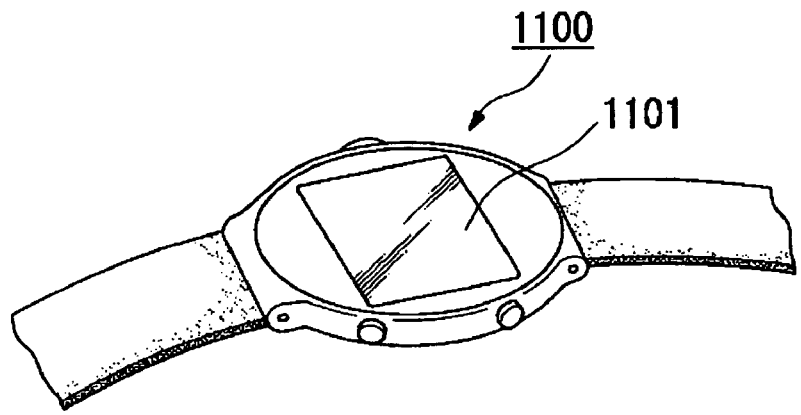
FIG. 19 is a perspective view of another example of electronic apparatus including the electronic device or optical device according to an exemplary embodiment of the present invention.

FIG. 19 is a perspective view of an example of wristwatch-type electronic apparatus. FIG. 19 shows a wristwatch main body 1100 and a display unit 1101 using the electronic device.

Figure 20:
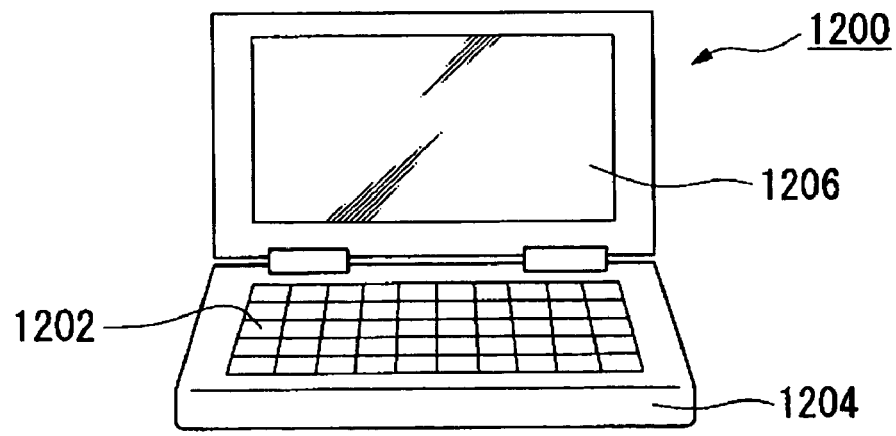
FIG. 20 is a perspective view of another example of electronic apparatus including the electronic device or optical device according to an exemplary embodiment of the present invention.

FIG. 20 is a perspective view of an example of mobile information processors, such as word processors and personal computers. FIG. 20 shows an information processor 1200, an input unit 1202 such as a key board, an information processor main body 1204, and a display unit 1206 using the electronic device.

The electronic apparatus shown in FIGS. 18 to 20 includes any of the electronic device according to the exemplary embodiments, can display images in the display unit with a stable intensity for a long time and can thereby exhibit a high degree of reliability for a long time. The electronic apparatus includes the electronic device using the device substrate and can thereby be produced at lower cost.

It is to be understood that the present invention is not limited to the disclosed exemplary embodiments. On the contrary, the present invention is intended to cover various modifications and equivalent arrangements included within the spirit and scope of the appended claims. Materials, layer structures, and other configurations illustrated in the embodiments are only by example and can be appropriately modified.

ADVANTAGES

As is described above, the device substrate according to the present invention include a film having a phase separation structure. The film can be easily formed by a coating process which does not require a vacuum process, in contrast to related art film-forming processes, and can serve as a reflective layer. The resulting device substrates can thereby be produced at lower cost than related art equivalents.

By appropriately selecting materials constituting the film having a phase separation structure, the film can have an insulation function in addition to the reflection function and can thereby play two roles as an insulator and as a reflective film on a substrate, even when the film have the simplest film configuration of a single layer. Accordingly, the device configuration can be simplified, and the resulting device substrates can exhibit a high degree of reliability for a long time.

The method to produce a device substrate, according to the present invention, does not require related art expensive film-forming device using a vacuum process for the formation of the film having a phase separation structure and can employ a coating process that can easily form a film under atmospheric conditions. Thus, the method can produce device substrates at low cost. In particular, by using the ink jet process among such coating processes, the method can further highly efficiently utilize materials for the formation of the film.

The electronic device, according to the present invention, includes the device substrate including the film having a phase separation structure having the above advantages, and an optical device and can thereby be low-cost and exhibit a high degree of reliability for a long time.

The optical device, according to the present invention, includes the film having a phase separation structure having the above advantages as a reflective film and can thereby be low-cost and exhibit a high degree of reliability for a long time. For example, when the optical device is an organic EL device including the film having a phase separation structure as a reflective film or an insulating film, the device becomes free of electrical, optical, and/or mechanical malfunctions, since the internal strain is suppressed or the device has improved resistance against external electrostatic discharge damage. The optical device, can thereby exhibit a higher degree of reliability for a long time than related art devices.

The methods to produce an electronic device or an optical device according to the present invention, each include at least the film-forming step in which a mixture including plural materials immiscible with each other is applied to form a film having a phase separation structure. The film-forming step can produce the film having a phase separation structure, capable of serving as a reflective film by a low-cost coating process, without requiring an expensive vacuum process. The methods to produce an electronic device or an optical device according to the present invention can produce electronic device or optical device at reduced cost and can thereby contribute to provide electronic device or optical device at lower cost than related art devices.

The electronic apparatus, according to the present invention, includes the electronic device or the optical device exhibiting an improved long-term reliability and can thereby have a longer life. The electronic apparatus can carry low-cost electronic device and can be obtained at further lower cost.

What is claimed is:

1. A device substrate comprising:
   a substrate;
   an electronic element mounted above the substrate;
   an electrode that is connected to the electronic element and that is mounted above the substrate; and
   a film having a phase separation structure that is disposed between the electrode and the substrate,
   the electronic element being disposed between the electrode and the substrate.

2. The device substrate according to claim 1, the film behind disposed between the electronic element and the substrate.

3. The device substrate according to claim 1, the electronic element being a switching element.

4. The device substrate according to claim 1, the film being arranged such that the film does not contact the substrate.

5. An optical device comprising: the device substrate according to claim 1; and
   an optical element mounted above the electrode, the film functioning as a reflective film.

6. A device substrate comprising:
   a substrate; and
   a film having a phase separation structure, the film having a plurality of portions, the plurality of portions corresponding to a plurality of colors.

7. The device according to claim 6, the film being an insulating film.

8. The device substrate according to claim 7, each of the plurality of portions including a plurality of phases of materials immiscible with each other.

9. The device substrate according to claim 6, each of the plurality of portions including a plurality of phases of materials immiscible with each other.

10. An electronic device, comprising:
    the device substrate according to claim 6.

11. An electronic apparatus, comprising:
    the electronic device according to claim 10.

12. An optical device, comprising:
    the device susbtrate according to claim 6; and
    an optical element mounted above the substrate, the film functioning as a reflective film.

13. The optical device according to claim 12, the film being disposed between the substrate and the optical element.

14. The device susbtrate according to claim 6, lattice constants being different among the plurality of portions.

15. The device susbtrate according to claim 6,
each of the plurality portions including a plurality of materials, and
ratios of amounts of the plurality of materials being different among the plurality of portions.

16. The device susbtrate according to claim 6, properties of reflection of light being different among the plurality of portions.

17. A method to produce a device substrate, the method comprising:
forming a switching element on a substrate; and
forming a film having a phase separation structure that covers at least a part of the switching element,
the forming of the film including an arrangement of a mixture that includes a plurality of materials immiscible with each other.

18. The method according to claim 17, the mixture being in liquid form.

19. A method to produce an electronic device, the method comprising:
forming the device substrate according to claim 17.

20. A method to produce a device substrate, the method comprising:
providing a susbtrate; and
forming a film having a phase separation structure above the substrate,
the forming of the film including an arrangement of a plurality of mixtures that include different types, different compositions or different ratios of amounts of a plurality of materials.

21. The method according to claim 20, the plurality of mixtures being in liquid forms, and the arrangement of the plurality of mixtures including a discharge of the plurality of mixtures to predetermined positions.

22. The method according to claim 21, the forming of the film including at least one of thermal treatment of the substrate and removal of a solvent included in each of the plurality of mixtures after the discharge of the plurality of mixtures is carried out.

23. The method according to claim 20,
each of the plurality of mixtures including the plurality of materials, and
ratio of amounts of the plurality of materials being different among the plurality of mixtures.

24. A method to produce an optical device, the method comprising:
forming an electronic element layer that includes a switching element above a susbtrate; and
forming a film having a phase separation structure above the substrate,
the forming of the film including an arrangement of a mixture that is in liquid form and that includes a plurality of materials immiscible with each other.

* * * * *